INVENTOR
HAROLD F. DUMBLETON
BY
*Mason & Graham*
ATTORNEYS

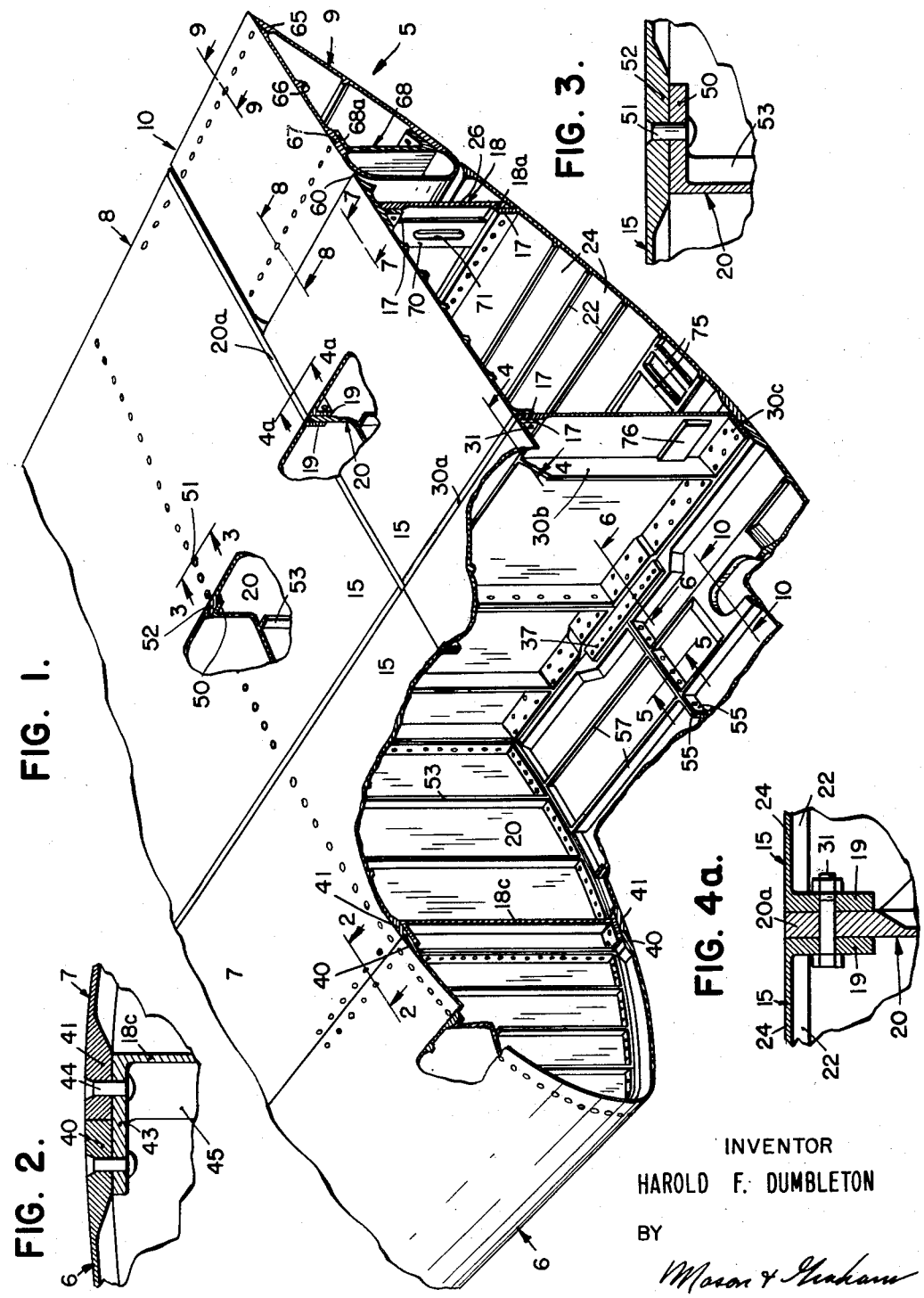
Oct. 28, 1952     H. F. DUMBLETON     2,615,234
METHOD OF MAKING AN INTEGRALLY REINFORCED
AIRPLANE CONSTRUCTION
Filed March 4, 1948     2 SHEETS—SHEET 1
INVENTOR
HAROLD F. DUMBLETON
BY
*Mason & Graham*
ATTORNEYS Oct. 28, 1952     H. F. DUMBLETON     2,615,234
METHOD OF MAKING AN INTEGRALLY REINFORCED
AIRPLANE CONSTRUCTION
Filed March 4, 1948                                      2 SHEETS—SHEET 2

Patented Oct. 28, 1952

2,615,234

UNITED STATES PATENT OFFICE 2,615,234

METHOD OF MAKING AN INTEGRALLY REINFORCED AIRPLANE CONSTRUCTION

Harold F. Dumbleton, Alhambra, Calif., assignor to Western Equipment Company, Los Angeles, Calif., a partnership Application March 4, 1948, Serial No. 12,906

1 Claim. (Cl. 29—148.2)

This invention has to do with aircraft construction, relating more particularly to providing a construction wherein the metal sheets for wings, fuselages, et cetera, are made with integral reinforcing ribs, flanges and the like of relatively varied thickness.

In aircraft construction it is among the major aims, of course, to eliminate unnecessary weight to allow for added pay load, to reduce the number of rivets and bolts used to hold separate parts together without sacrificing strength, and to provide joints across which loads may be efficiently carried. In this latter construction it has been the conventional practice to add doubler plates and other fittings at the joints between spanwise sheets to carry the flange loads across the joints. Aside from the fact that this requires added parts and wasteful overlapping of material, the transfer of loads to such plates or fittings involves the use of numerous rivets or bolts, so that in addition to the weight and cost factors, the rivet or bolt holes remove portions of the flange material so that the net section, in stress, is less than the basic flange area. To offset this the basic flange area must be increased.

While the advantages of integral reinforcing and stiffening are well known, heretofore no practical means or method of accomplishing it has been devised. Metal castings cannot be used because of the prohibitive weight of cast materials occasioned by their relatively low allowable strength, and forgings are impractical because of size limitations.

In conventional airplane construction it has been the practice, in attaching spar caps to the skins or sheets, to rivet or bolt to the sheets separate reinforcing or stiffening plates, but such plates add considerably to the weight and the rivets and bolts are subject to fatigue and loosening under the influence of the tremendous vibration stresses imposed upon an airplane structure in use. Considerable use of stiffening ribs bolted or riveted to the skins is made where high sheer loads must be transmitted. Also, reinforcing plates of T- or angle cross-section are riveted to the skins for the attachment of spars and frequently the flange area required for such plates additionally requires the aid of reinforcing plates. In airplane construction the trend is always to higher safety factors and to provide those added factors conventional practice makes it necessary to add considerable weight. Another shortcoming of conventional practice resides in the inspection difficulties arising out of the number of blind rivets which must necessarily be used.

It is a major object of the present invention to provide a novel, practical and simplified construction and method wherein airplane wings, fuselages, spars, ailerons and the like may be made to embody integral reinforcement which reduces weight and provides increased strength.

It is another object to provide a construction wherein the sheets from which such airplane parts are formed are machine tapered to produce variable thicknesses and integral reinforcement.

It is an additional object to provide still further advantages made possible by the accomplishment of the main objects hereinabove discussed, but those will appear more fully from the following description of presently preferred embodiments of the invention illustrated in the accompanying drawings. It is to be understood, however, that the details of structure and procedure now to be described are intended merely as illustrative and explanatory rather than as limitative upon the broader aspects of the invention as defined by the accompanying claim.

In general, I overcome the difficulties and shortcomings of conventional construction by selecting relatively thick sheets and then machine tapering them to provide both spanwise and chordwise stiffening rib sand flanges for attachment of bulkheads and spars, for joints and for mounting operating parts. This also provides between the ribs or flanges relatively thin skin portions to reduce unnecessary weight. By this construction it is relatively simple to vary the section and depth of the integral stiffening ribs and flanges to provide sufficient allowable strength to carry the desired design loads. My novel construction also eliminates all unnecessary weight and parts and eliminates the necessity of numerous rivet and bolt holes and provides substantially unmarred skin surfaces.

In the drawings,

Fig. 1 illustrates, in perspective, a portion of an airplane wing made in accordance with this invention, some parts being broken away and sectioned for illustrative purposes;

Figs. 2 to 10, inclusive, are enlarged sections taken, respectively, on lines 2—2, 3—3, 4—4, 4a—4a, 5—5, 6—6, 7—7, 8—8, 9—9, and 10—10 of Fig. 1;

Figure 5:
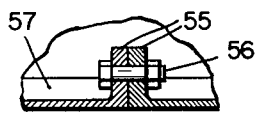

Referring now to the drawings, the numeral 5 generally denotes an airplane wing having a front or nose portion 6, an inner section 7, a trailing or outer section 8, an aileron 9, and a flap 10.

Figure 12:
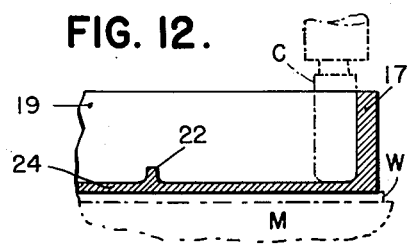
Fig. 12 is a sectional view showing a sheet being machine tapered by a machine tool shown in elevation.
Figure 13:
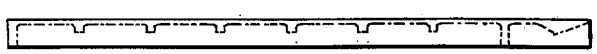
Fig. 13 is a side edge elevation of a sheet before it has been machine tapered according to this invention, the lines of the machine cuts being denoted in broken lines.

The sheets 15 going to make up a skin or wing are, according to this invention, first selected of a thickness at least equal to the thickness required to provide the reinforcing or stiffening element which projects therefrom the greatest distance. In the embodiment illustrated those elements usually are the spanwise ribs or flanges 17 to which the spanwise spars 18 have their caps 18a attached, and the chordwise ribs or flanges 19 to which the chordwise bulkheads are attached. The sheets are then placed upon a vacuum work holder W (Fig. 12) secured on the bed of a milling machine M and moved through the milling machine relative to a rotating cutter C, and sufficient material of the sheets is cut away by the cutter to leave the ribs 17, 19, 22 and the intervening relatively thin skin portions 24.

Similarly, to provide spars having integral end caps and relatively thin intervening portions, sheets are selected of a thickness at least equal to the thickness required for the caps and then the sheets are milled to cut away metal between the caps to leave the relatively thin intervening portion 26 and the relatively thick caps.

Figure 6:
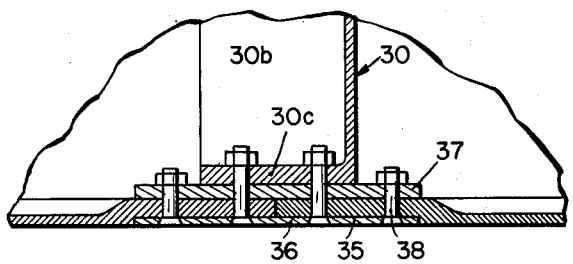
Figure 4:
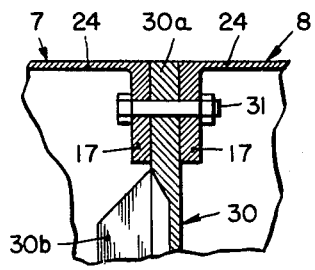

In Fig. 4 there is illustrated typically the formation of the skins and bulkheads where the outer or trailing portion 8 of the wing joins the inner wing portion 7. Here it will be noted that the bulkhead 30 has a relatively thick top edge or cap portion 30a sandwiched between ribs 17 formed integral with the skins, and that the bulkhead also has integral stiffening ribs 30b formed in the manner before described. Bolts 31, or other suitable securing means, are used to secure the skin ribs 17 to the bulkhead. At the lower edge of the bulkhead there may be a flange or stiffening rib 30c formed integral with the bulkhead and the bulkhead stiffening ribs 30b, and at the point where the lower skin sheet of the outer wing joins the inner wing (Fig. 6) the outer surface of the skin may be recessed at 35 to compensate for the outer doubler plate 36, an inner doubler plate 37 being interposed between the rib 30c and the plate 37, the entire assembly being secured together as by bolts 38.

The structure shown in Fig. 4a is like that shown in Fig. 4 except that it illustrates a chordwise joint, illustrating chordwise reinforcing and attachment ribs 19 with the relatively thickened top edge portion of a chordwise bulkhead 20 sandwiched therebetween and held by bolts 31.

The sheet for the nose portion of the wing is placed on the work holder and milled as before described while the sheet is in flattened condition. It is milled to provide for instance the relatively thick spanwise side edge ribs 40 which abut the relatively thick spanwise side edge ribs 41 of the top and bottom sheets forming the inner wing (Fig. 2), and a chordwise spar 18c is formed with relatively thick end flanges or caps 43 for attachment to the abutting ribs 40, 41 as by rivets 44. Integral vertical stiffening ribs 45 are provided for the spar 18c.

In Fig. 3 a chordwise bulkhead flange or rib 50 is shown as being formed integral with the bulkhead 20 and is secured to the relatively thickened intermediate rib portion 52 of the outer wing as by rivets 51. The bulkhead is also formed with integral stiffening rib 53.

In Fig. 5 there is shown, formed integral with contiguous spanwise wing sections, chordwise stiffening ribs 55 secured together as by bolts 56, the sheets forming said wing sections also being reinforced by integral spanwise reinforcing or stiffening ribs 57.

Figure 7:
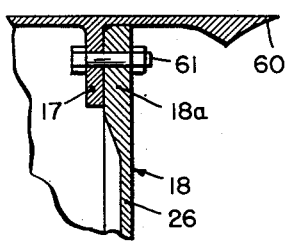

In Fig. 7 there is shown the rear end edge portion of the top sheet of the outer wing which terminates at the recess wherein there is mounted an aileron 9, the sheet having its extreme rear edge portion tapered to substantially a point as shown at 60. The rear of the rib 17 of the sheet is attached to the spar cap 18a as by bolts 61.

Figure 8:
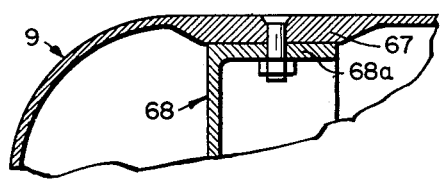
Figure 9:
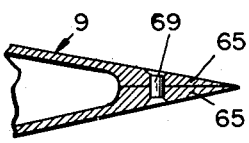
Figure 10:
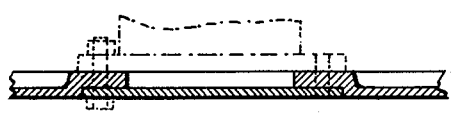
Figure 11:
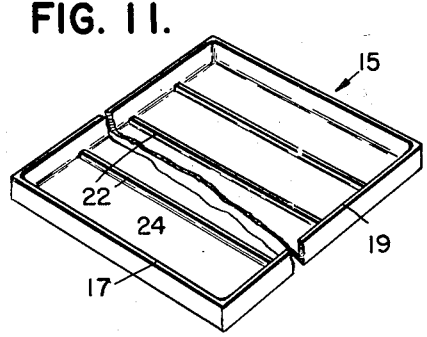
Fig. 11 is a perspective of a sheet after it has been machine tapered to provide integral reinforcing ribs and flanges and relatively thin intervening portions.

The aileron 9 (Figs. 8 and 9) is formed of a flat sheet milled and tapered as before described to provide tapered ends 65, spanwise stiffening ribs 66 and spanwise reinforcing ribs 67 to receive the caps 68a of the spar 68. After being so machined the sheet is bent into the position shown in Fig. 1 and the ends 65 secured together as by rivets 69.

By reference to Fig. 1 it will be seen how it is easily possible to provide bosses for the mounting of operating devices such as motors and for other purposes. For instance, at 70 there is shown formed integrally with spar 18 a boss having a hole 71 to pass the cable (not shown) which leads to and operates the aileron 9, and at 75, 76 are shown bosses for the mounting of an element such as a motor (not shown).

In the foregoing I have described only a few of the specific phases of airplane construction to which my invention is peculiarly suitable, and in the formation of all parts shown, a substantially common procedure in construction is followed—that is, the sheets or strips are first selected of a thickness to provide the stiffening ribs, webs, flanges and caps, and then the sheets are machine tapered to provide the integral ribs, webs, flanges and caps, as well as the intervening portions of relatively thin section. In other words, my method and structure are readily adaptable to improved construction of any part of an airplane wing or fuselage. Thus, not only are the weight and strength disadvantages and excessive costs of using separate, attached elements to provide the ribs, webs, flanges, caps and joints, avoided, but also it is unnecessary to maintain large stocks of flange material such as angle irons, T-irons, I-beams and plates, as well as riveting equipment and personnel. It is also possible to more accurately and readily engineer any given structure for the desired load and stress allowance. Failures due to fatigue and breakage of attachment means and vibration are substantially entirely eliminated. The material cut away from the sheets in the tapered operations is not wasted because the shavings are collected and reprocessed as scrap.

I claim:

The method of constructing an airplane wing which comprises selecting metal skin sheets of a thickness greater than required for the finished skin, machining said sheets to remove therefrom metal constituting part of the thickness between their ends whereby to leave integral inwardly disposed end flanges, providing bulkhead sheets, assembling said skin sheets end to end and sandwiching a portion of the bulkhead sheets between said flanges.

HAROLD F. DUMBLETON.

REFERENCES CITED

The following references are of record in the file of this patent:

UNITED STATES PATENTS

| Number | Name | Date |
|---|---|---|
| 1,781,723 | Fox | Nov. 18, 1930 |
| 1,885,406 | Bechereau | Nov. 1, 1932 |
| 2,121,670 | Saives | June 21, 1938 |
| 2,230,393 | Thomson | Feb. 4, 1941 |
| 2,286,971 | Murray et al. | June 16, 1942 |
| 2,350,827 | Saulnier | June 6, 1944 |
| 2,382,356 | Watter | Aug. 14, 1945 |
| 2,432,396 | Earhart | Dec. 9, 1947 |